(12) United States Patent
Seigler et al.

(10) Patent No.: US 10,013,872 B1
(45) Date of Patent: Jul. 3, 2018

(54) FIRE SENTRY

(71) Applicants: Benjamin Henry Seigler, Sevierville, TN (US); Tom Columbano, Clewiston, FL (US)

(72) Inventors: Benjamin Henry Seigler, Sevierville, TN (US); Tom Columbano, Clewiston, FL (US)

( * ) Notice: Subject to any disclaimer, the term of this patent is extended or adjusted under 35 U.S.C. 154(b) by 0 days.

(21) Appl. No.: 15/402,659

(22) Filed: Jan. 10, 2017

Related U.S. Application Data

(63) Continuation-in-part of application No. 13/999,577, filed on Mar. 11, 2014, now Pat. No. 9,543,945, which is a continuation-in-part of application No. 13/164,299, filed on Jun. 20, 2011, now abandoned.

(51) Int. Cl.
| | |
|---|---|
| *G08B 17/00* | (2006.01) |
| *G08B 29/04* | (2006.01) |
| *G08B 29/18* | (2006.01) |
| *G08B 17/10* | (2006.01) |
| *G08B 21/14* | (2006.01) |
| *G08B 19/00* | (2006.01) |
| *H04L 12/28* | (2006.01) |

(52) U.S. Cl.
CPC ........... *G08B 29/043* (2013.01); *G08B 17/10* (2013.01); *G08B 19/00* (2013.01); *G08B 21/14* (2013.01); *G08B 29/185* (2013.01); *H04L 12/2816* (2013.01); *H04L 2012/285* (2013.01)

(58) Field of Classification Search
CPC ... F24C 3/12; F24C 7/08; F24C 3/126; G08B 17/10; Y10T 137/1915
See application file for complete search history.

(56) References Cited

U.S. PATENT DOCUMENTS

| | | | |
|---|---|---|---|
| 5,939,992 A | 8/1999 | Devries et al. | |
| 9,543,945 B2 | 1/2017 | Seigler et al. | |
| 2006/0170542 A1 | 8/2006 | Schoor | |
| 2006/0232431 A1* | 10/2006 | Shirlee | F24C 3/12 340/628 |
| 2010/0109887 A1 | 5/2010 | Crucs | |
| 2010/0225493 A1* | 9/2010 | Zishaan | F24F 11/0017 340/627 |
| 2012/0229285 A1* | 9/2012 | Rauworth | G08B 17/10 340/628 |

* cited by examiner

*Primary Examiner* — Hongmin Fan
(74) *Attorney, Agent, or Firm* — Malloy & Malloy, P.L.

(57) ABSTRACT

System, method, and apparatus for automatically disabling an appliance to prevent accidental fires. A shut-off system is coupled to a smoke detector. When the smoke detector alarm is activated a signal is sent to the shut off system coupled to a cooking appliance. The shut off system includes a timer and an override mechanism. If the override mechanism is triggered prior to the timer expiring, then the shut off system does not activate. If the override mechanism is not triggered prior to the timer expiring then the shut off system activates and decouples the appliance from its power supply.

15 Claims, 2 Drawing Sheets

FIRE SENTRY

CLAIM OF PRIORITY

The present application is a Continuation-In-Part application of previously filed, application having Ser. No. 13/999,577 which was filed on Mar. 11, 2014, which matures into U.S. Pat. No. 9,543,945 on Jan. 10, 2017, which is a Continuation-In-Part of U.S. patent application having Ser. No. 13/164,299 filed Jun. 20, 2011, also incorporated herein by reference, which is abandoned.

BACKGROUND OF THE INVENTION

Field of the Invention

Certain embodiments of the invention relate to automated safety capabilities for appliances. More specifically, certain embodiments of the invention relate to safety devices for disabling appliances in response to the activation of a smoke alarm.

Background of the Invention

Most residential fires originate in the kitchen as a result of negligence during cooking. Ovens and stove-top burners are often left unattended. Gas or electric stoves and ovens are found in most homes and apartments, and also in some office buildings. Many of these stoves and ovens have built-in timers that may be set by a user to give an audible alarm after a set time interval has elapsed. Such alarms remind the user to check what they are cooking on the stove or in the oven and to turn off the power to the oven or cook-top. However, a user may simply forget that the stove or oven is in use. This problem is compounded if the user has an illness such as Alzheimer's disease or other mental impairment that affects memory. Also, if a user does not hear the timer's audible alarm, then the oven or cooking surface remains on and the food may become overcooked or burnt, and a fire may start. A user may not hear the timer alarm because the user may be in a different room in the house, or because the user may be hearing-impaired, for example. Still other fires have been caused by falling asleep while cooking. In addition, unforeseen events such as electrical shorts, earthquakes, and product failures can result in accidental fires.

Additional objects of the present invention will become apparent from reading of the summary and detailed description set forth below.

SUMMARY OF THE INVENTION

The present invention provides a novel system for removing the supply of electric power or flammable gas from cooking appliances upon the detection of smoke. The invention incorporates several advantageous features not previously available in similar art.

First, the present invention includes an override mechanism to allow for cooking food to cause smoke without immediately triggering the shut-off switch of the inventive system.

Further, the present invention can be engineered to be portable and easy to install. Importantly, the size of the current invention, and hence its portability, can be customized to meet the specifications of a particular application. This capability greatly expands the realm of its uses.

In accordance with the broad aspect of the invention a sensor, remote from a cooking appliance to be deactivated, is conditioned to respond to one or more predetermined environmental conditions. Upon sensing the pre-determined environmental conditions the sensor transmits an activating signal in response to the triggering environmental conditions. A receiver is coupled with a deactivation device and is operative to decouple the appliance's power supply from the cooking appliance.

In accordance with at least one preferred embodiment, the invention comprises a remotely located smoke detector in responsive communication with a transmitter for broadcasting an alarm signal when smoke is detected by the smoke detector, and a receiver, proximate to a deactivation device, adapted to deactivate at least one cooking appliance in response to the alarm signal. Thus, when smoke is remotely detected, the deactivation device would deactivate for example, a gas stove by closing a gas shut off valve that could feed the fire. Alternatively, for example, the deactivation device would open an electrical circuit to disable heat-producing cooking devices connected to the system which could be possible sources of the fire.

The at least one preferred embodiment further comprises a timer assembly, including at least a first timer, operatively associated with the deactivation device. The first timer is operatively configured to delay operation of the deactivation device for a pre-set interval of time after the deactivation device receives an alarm signal from the transmitter associated with the smoke detector. As a result, the operation of the deactivation device is delayed until the expiration of the pre-set interval of time. The timer assembly, including the first timer, includes or is operatively coupled with an override device which, when manually triggered before the expiration of the first pre-set time interval, halts the first timer thus effectively overriding operation of the deactivation device. Because cooks often prepare food in a manner that intentionally leads to sufficient smoke to set off a smoke detector, this timer/override feature allows an operator to temporarily override the cooking appliance deactivation system. While at the same time, if the cooking appliance has been left on while unattended, the override feature will not be manually triggered and the deactivation device will decouple the cooking appliance from its power source at the end of the first timer's pre-set time interval.

In one embodiment of the present invention the deactivation device is an electrical interface between a permanent electrical power source and an electric cooking appliance and is adapted to interrupt electric power from the power source to the appliance when a specified environmental condition is detected. The electrical deactivation device of the present invention preferably includes at least a pair of input terminals, similar to the male prongs of a power supply cord plug, adapted for releasable engagement with a source of electrical power, such as a conventional wall socket providing alternating current power. The electrical deactivation device further includes at least one pair of output terminals, similar to the female receptacles of a wall socket, adapted for releasable engagement with input terminals associated with the appliance, such as a conventional power cord plug. In at least one preferred embodiment, one set of input (male) terminals are provided for each set of output (female) terminals.

The electrical deactivation system of the present invention includes a smoke detector configured to send a signal to the timer assembly including the first timer associated with the electrical deactivation device upon detection of smoke. The circuit of the first timer is operative to delay operation of the electrical deactivation device until passage of a pre-set time interval. Upon expiration of the first pre-set time interval, if the manual override mechanism has not been triggered, the first timer is operative to trigger the electrical deactivation device, thereby interrupting electrical power to the output terminal of the electrical deactivation device, thereby decoupling the cooking appliance from its electrical power source.

In one or more preferred embodiments of the present invention, a timer alarm is provided in the deactivation device that is operative to indicate when the deactivation device has received an alarm signal from the smoke detector. The timer alarm may include a visual indicator and/or an audio indicator. The timer alarm begins simultaneously with countdown of the first time interval by the first timer which is included within the circuit of the deactivation device. In this embodiment the timer alarm is deactivated if the manual override mechanism is triggered.

At least one additional preferred embodiment of the present invention includes a mechanism for automatically shutting off flow of flammable gas to a cooking appliance. Automatically shutting off flow of gas may be accomplished by automatically closing a gas flow path to the cooking appliance in response to the alarm signal transmitted from a remotely located smoke detector to the deactivation device, as described herein. The closing of gas flow path may be accomplished by shifting a two-stage in-line gas valve from a flow to a non-flow position. This embodiment may include an electrical circuit and electrical motor operatively associated with the gas valve for closing the gas valve upon expiration of the time interval of the countdown by the first timer. The electrical circuit and electric motor may require a power source that is otherwise independent from the system of the instant invention.

Beneficially, the components of the present invention can be configured to be self-contained. Therefore, the present invention may be installed into existing buildings without any need for rewiring. This may be especially useful in rental properties where a person may not be allowed to modify the electrical systems. In addition, the components are portable, and may be installed in a dwelling that will only be occupied for a short time, then removed and taken to a new location. This would be difficult or impossible to do with hard-wired systems. All of the components of the preferred embodiment of the instant invention weigh less than five pounds and consist of less than one cubic meter of volume.

Also, the components of a preferred embodiment of the instant invention are configured to allow for installation with no tools in minutes. An attachment device comprising hook and loop adhesive is bonded to the bottom of the smoke detector with the other half of the hook and loop adhesives bonded to a surface above the cooking appliance. The deactivation device, with the first timer and override mechanism, is inserted into the electrical outlet and the male end of the cooking appliance power cord is inserted into the output side of the deactivation device.

These and other advantages of the invention are further described in the detailed description.

BRIEF DESCRIPTION OF THE DRAWINGS

The accompanying drawings illustrate exemplary embodiments of the present invention.

DETAILED DESCRIPTION OF THE DRAWINGS

The present invention provides a novel system for removing the supply of electric power or flammable gas from cooking appliances upon the detection of smoke, which is described more fully hereinafter. This invention may be embodied in many different forms and should not be construed as limited to the specific embodiments described herein.

Figure 1:
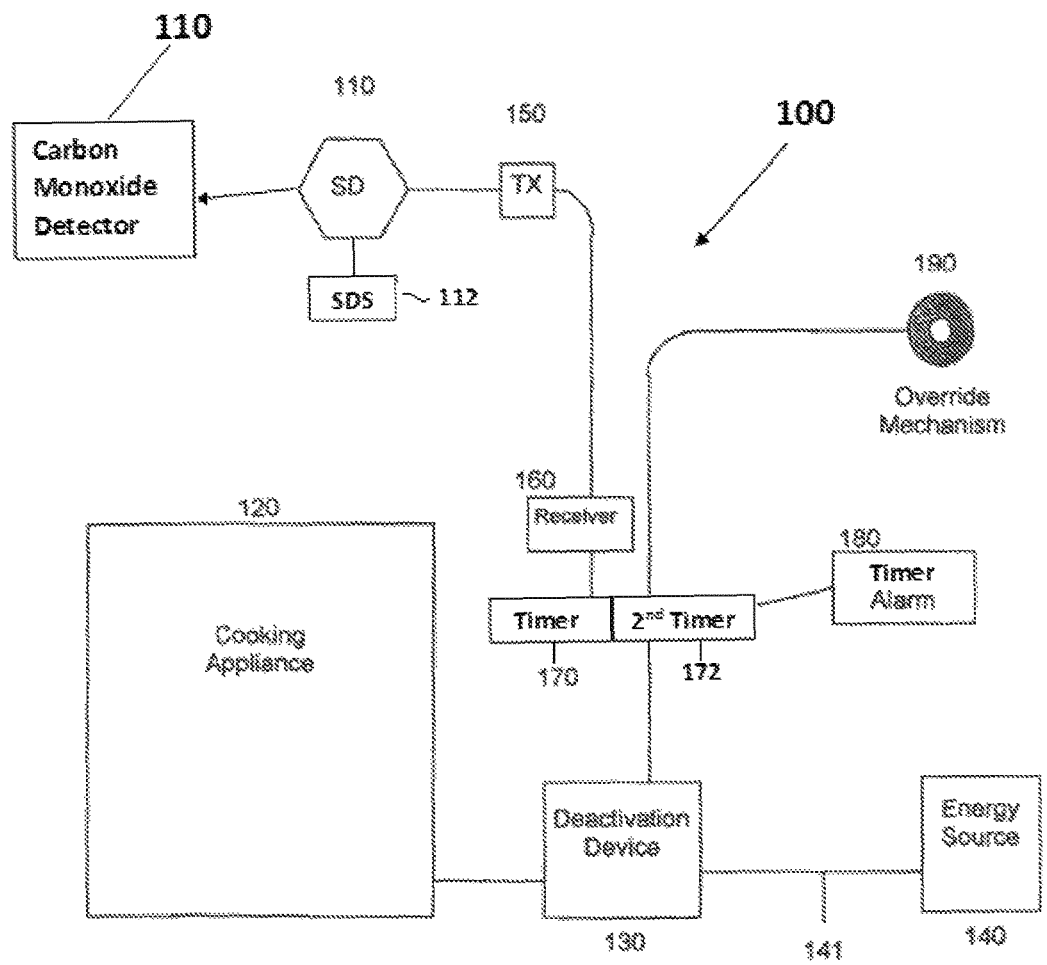
FIG. 1 is a functional block diagram disclosing the configuration of components of a preferred embodiment in relation to each other.

Referring now to the drawings, FIG. 1 illustrates a functional block diagram of an embodiment of a system 100 for disabling a cooking appliance in response to an alarm from a sensor structured to detect and/or sense a predetermined environmental condition. In the embodiment represented, the sensor 110 comprises a smoke detector. Accordingly, the system 100 includes the sensor/smoke detector 110 and a cooking appliance 120. The appliance 120 may be, for example, a gas stove, an electric stove, a gas oven, an electric oven, a microwave oven, an electric skillet, a hot plate, or a combination thereof. Other types of appliances are possible as well.

The system 100 also includes a deactivation device 130. The deactivation device 130 is operatively connected to the smoke detector 110 and the appliance 120. The deactivation device 130 is connected between an energy source 140 (e.g., a combustible gas source or an electric source) and the appliance 120 by, for example, a main line 141 leading from the energy source 140 to the appliance 120. During normal operation, the deactivation device 130 allows energy (e.g., combustible gas or electricity) to pass from the energy source 140 to the appliance 120.

When the smoke detector 110 detects smoke, a transmitter 150 operatively associated with the smoke detector 110 generates a signal which is received by a receiver 160 which is operatively associated with the deactivation device 130.

The receiver 160 receives the signal from the transmitter 150 which is operatively associated with a timer assembly, including at least a first timer 170 and in one or more additional embodiments a secondary timer 172. The first timer 170 is operatively associated with the receiver 160 and the deactivation device 130 and is operative to begin counting down a first pre-set interval of time and simultaneously trigger a timer alarm 180. The timer alarm 180 may include a visual indicator and/or an audio indicator, providing an indication that the timer has begun the countdown, which comprises the first pre-set interval of time.

An override mechanism 190 operatively associated with the timer 170 may be manually triggered at any time during and before the expiration of the countdown of the timer 170. If the override mechanism 190 is manually triggered, then the timer 170 halts the countdown of the first time interval and the timer alarm 180 ceases, indicating that the first time interval of the countdown of the timer 170 has been halted. Triggering the manual override mechanism 190 at least temporarily cancels operation of the system 100. When the manual override 190 is triggered the system 100 halts its functions until the manual override mechanism 190 is manually placed back into the non-override position. In an alternate embodiment, the manual override mechanism 190 is operatively coupled to a secondary timer 172 of the timer assembly. The secondary timer 172 may be a part of or be operatively associated with the first timer 170. In this alternate embodiment, the secondary timer 172 automatically places the manual override mechanism 190 into the non-override position upon the expiration of a second pre-set time interval.

If the override mechanism 190 is not manually triggered before expiration of the first timer's 170 countdown, then the deactivation device 130 effectively blocks the flow of energy from the energy source 140 to the appliance 120 in response to the signal from the transmitter 150 and upon expiration of the countdown of the timer 170. Therefore, if the appliance 120 is the source of the detected smoke, then disabling the appliance 120 by blocking the flow of energy to the appliance 120 may help reduce or extinguish any associated fire causing the smoke.

In accordance with various embodiments of the present invention, the signal sent from the transmitter 150 to the receiver 160 may be sent via wired means or wirelessly. The signal may be, for example, a radio frequency (RF) signal, infrared (IR), other electromagnetic frequency, a pulsed signal, or a simple voltage level.

In accordance with various embodiments of the present invention, the timer alarm 180 may include a visual signal such as a light or color shift, or an auditory signal such as an alarm tone, or a combination of visual and auditory signals. The signals may also include flashes, variable, alternating, or steady signals.

As also schematically represented in FIG. 1, the system of the present invention may include a carbon monoxide detector device and/or assembly 110'. As indicated the carbon monoxide detector 110' may be directly associated with smoke detector or may be used in combination therewith, independently thereof and be physically separated therefrom. Further the detection of a predetermined amount of carbon monoxide will serve to activate the remainder of the system as set forth above concurrently to the detection of smoke by the smoke detector 110. In the alternative, the carbon monoxide detector 110' may activate a remainder of the system in the absence of smoke, wherein the predetermined amount of carbon monoxide is detected independently of smoke detection. As used herein, the term "predetermined amount", relating to the detection of carbon monoxide, may include an amount or level which is generally considered abnormal, excessive, dangerous and/or potentially harmful to individuals. Further, such predetermined levels of carbon monoxide being detected may be involved directly with or independently of the existence and detection of smoke in the area being monitored.

Figure 2:
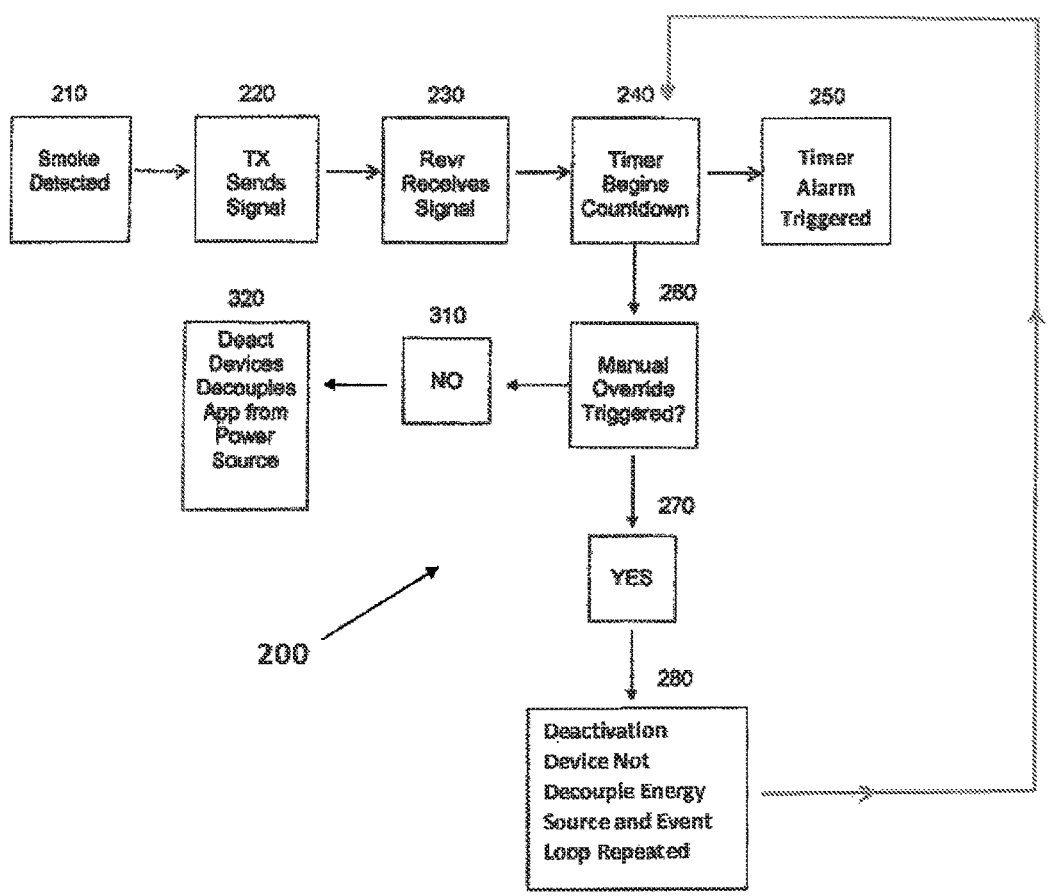
FIG. 2 is a flow chart disclosing an exemplary operation of the preferred embodiment.

FIG. 2 is a flow chart illustrating a method 200 of operation of one or more preferred embodiments of the system 100. As set forth above, a more preferred embodiment of the system 100 is operative for disabling of a cooking appliance 120 in response to an alarm from a smoke detector 110. Accordingly, the method 200 includes a detection of smoke 210 which triggers transmission of a signal 220 from a transmitter 150, operatively associated with a smoke detector 110. The method 200 also includes the receiver 160, operatively associated with a timer 170 receiving the signal 230 sent from the transmitter 150, resulting in the timer 170, operatively associated with the receiver 160, beginning a countdown of a first pre-set interval of time 240 and a triggering of the timer alarm 180, as at 250.

Upon beginning of the countdown 240 a timer alarm 180 is triggered. The timer alarm 180 may include a visual signal such as a light or color shift, or an auditory signal such as an alarm tone, or a combination of visual and auditory signals. The signals of the timer alarm may also include flashes, variable, alternating, or steady signals.

As indicated, the system 100 also includes the manual override mechanism 190 operatively associated with the timer 170. If the manual override mechanism 190 is triggered, as at 270, prior to the expiration of the countdown of the first time interval of the timer 170, then the timer alarm 180 is reset to indicate no alarm. As a result, the operation of the disabling system is at least temporarily cancelled and the deactivation device 130 will not operate to decouple the stove 120 from the energy source 140, as at 280.

If the manual override mechanism 190 is not triggered, as at 310 prior to the expiration of the countdown of the first time interval of the timer 170, then the deactivation device 130 decouples the cooking appliance 120 from its power source 140, as at 320.

EXAMPLES

The present invention is further described by the following non-limiting examples.

Example 1

Typical Fire Prevention

The instant invention provides a novel system and method for removing the supply of electric power or flammable gas 140 from cooking appliances 120 upon the detection of smoke. This Example describes an exemplary and typical use of the system 100 in accordance with the present invention.

Common operation of the system 100 described herein prevents accidental fire caused by leaving food unattended on a cooking appliance 120 after the appliance has been turned on. For example, if food is left on a stove top that has been turned on the food will eventually begin to smoke. Smoke from the pre-burning food will activate the smoke detector 110. The transmitter 150 of the present invention will, upon activation of the smoke detector 110, send a signal to the receiver 160 of the present invention. A light, sound or other signal 112 will indicate to the cook that the smoke detector 110 has detected smoke. If the cook does not manually set the override mechanism 190, then the deactivation device 130 of the present invention will decouple the stove top 120 from the stove top's energy source 140. By thus turning off the stove top, the present invention will prevent the food from achieving ignition temperature.

Example 2

Cooking Onions, and Triggering the Override

Continuing the above example, if the cook is supervising the food, and intends to allow the food to partially burn as part of the cooking process, then the cook can override the system 100 of the present invention by manually triggering the override mechanism 190. If the cook triggers the override mechanism 190, then the system 100 of the present invention is cancelled and the timer alarm 180 is stopped, indicating no alarm from the timer 170. In one embodiment the system 100 and the deactivation device 130 of the instant invention will remain inoperative, thereby not interrupting the power supply 140 to the cooking appliance 120, until the override mechanism 190 is manually re-set to its non-override position.

Example 3

Cooking Onions, Triggering the Override and then Forgetting the Onions

In an alternative embodiment triggering the override mechanism 190 will, at least temporarily, cancel operation of the deactivation device 130, but also cause the second timer 172, of the timer assembly, to begin counting down a second pre-set time interval. In this embodiment if the override mechanism 190 is not manually triggered again, prior to the expiration of the second pre-set time interval countdown by the second timer 172, then the override mechanism 190 automatically returns to its non-override position and the entire system 100 is re-set. If the system 100 is reset in this manner and if the smoke detector 110 is still detecting smoke, as at least partially indicated by the its generation of a smoke detector signal 112, after the override mechanism 190 is re-set to the non-override position, upon expiration of the second time interval countdown by the second timer 172, the transmitter 150 will again send a smoke detection signal to the receiver 160. As a result, the first timer 170 will again begin to countdown its first pre-set time interval. The smoke detector signal 112 will again indicate the detection of smoke by the smoke detector 110 and the system 100 will function as described above. The manual override 190 may be triggered again at this point prior to the expiration of the first pre-set time interval countdown of the first timer 170. As a result, if the manual override 190 is not triggered again before expiration of the first time interval countdown by the first timer 170, the deactivation device 130 will decouple the cooking appliance 120 from its power source 140. However, if the override mechanism 190 is again manually triggered, then again the first timer 170 will be halted, the timer alarm 180 will be stopped indicating a no alarm condition and the second timer 172 will begin counting down the second pre-set time interval.

The triggering of the override mechanism 190 may be repeated indefinitely. Each time the system 100 of the present invention is overridden by activation of the override mechanism 190, the system 100 may be re-set again, by another, subsequent activation of the override mechanism 190 during and before expiration of the first pre-set time interval countdown of the first timer 170. As a result the system will operate or pass into a continuous "event loop", as indicated in FIG. 2 as 280. The "event loop" described herein can be repeated indefinitely. Each time the system of the present invention is overridden it will re-set after the second pre-set time interval and as indicated can then be manually overridden again, as part of the aforementioned and described "event loop" 280.

If at any time the override function is not manually triggered before the expiration of the first pre-set time interval by the countdown of the first timer 170, then the system 100 will function to activate the deactivation device 130 and decouple the cooking appliance 120 from its energy source 140.

Accordingly, a cook using this system 100 will have the option to continue cooking even when smoke is detected by the smoke detector 110, simply by repeatedly triggering the manual override 190 each time the system indicates that the smoke detector alarm 112 has indicated the presence of smoke. If, at any time, the cook leaves the stove top unattended, and the first time interval of the first timer 170 expires, then the deactivation device 130 will turn off the stove top 120.

Once the smoke is removed from the area sufficient for the smoke detector 110 to stop its alarm 112, the system 100 will return to its non-alarm state. While the smoke detector 110 is in the non-alarm state, the transmitter 150 of the present invention will not send a signal to the receiver 160 and the first timer 170 and deactivation device 130 will not be activated. Therefore, whenever the smoke detector 110 is not detecting smoke, the system 100 of the present invention will not decouple the cooking appliance 120 from its energy source 140.

Now that the invention has been described,

What is claimed is:

1. A system for automatically shutting off at least one appliance, said system comprising:
   a smoke detector disposed and structured to detect smoke,
   a transmitter operatively coupled to said smoke detector and structured to generate an indicating signal indicative of smoke detection by said smoke detector,
   a timer assembly including a first timer operatively coupled to a receiver;
   said receiver configured to receive said indicating signal and said first timer operative to countdown a first time interval,
   a deactivation device operatively coupled to said first timer and structured to decouple the at least one appliance from an energy source, upon expiration of said first time interval, and
   an override mechanism structured to interrupt decoupling operation of said deactivation device prior to expiration of said first time interval by said first timer,
   said timer assembly including at least a second timer configured to countdown a second time interval, said override mechanism operatively coupled to said second timer and configured to initiate said countdown of said second time interval upon activation of said override mechanism, prior to expiration of said first time interval, and
   said transmitter structured to generate at least one other indicating signal to said first timer upon expiration of said second time interval and said smoke detector still detecting smoke.

2. The system as recited in claim 1 wherein said deactivation device is structured to decouple the at least one appliance from the energy source upon expiration of said first time interval and non-activation of said override mechanism.

3. The system as recited in 1 wherein said first timer is structured to reinstate countdown of said first time interval upon receipt of said at least one other indication signal by said receiver from said transmitter.

4. The system as recited in 1 wherein said transmitter is structured to successively generate a plurality of indicating signals to said first timer upon expiration of successive second time intervals and upon successively repeated activation of said override mechanism and said smoke detector still detecting smoke.

5. The system as recited in claim 1 wherein said first timer is operative to generate a timer signal concurrent to and indicative of said countdown of said first time interval.

6. The system as recited in claim 5 wherein said smoke detector is structured to generate a smoke detector signal concurrent to the detection of smoke; said smoke detector signal indicative of smoke detection by said smoke detector and distinguishable from said timer signal.

7. The system as recited in claim 1 wherein said smoke detector is structured to generate a smoke detector signal concurrent to the detection of smoke; said smoke detector signal indicative of smoke detection by said smoke detector.

8. The system as recited in claim 1 further comprising a carbon monoxide smoke detector structured to detect a predetermined level of carbon monoxide.

9. A method of operation of the system of claim 1 comprising:
   detecting smoke by said smoke detector,
   generating an indication signal by said transmitter to said first timer via said receiver upon the detection of smoke by said smoke detector,
   starting a countdown of said first time interval by said first timer,
   activating said deactivation device to decouple the at least one appliance from the energy source in the absence of a triggering of said override mechanism,
   preventing decoupling of the at least one appliance from the energy source concurrent to activation of said override mechanism prior to expiration of said first time interval, and
   beginning a countdown of at least one other first time interval by said first timer upon expiration of said second time interval and said smoke detector still detecting smoke.

10. The method as recited in claim 9 generating a timer signal concurrent to and indicative of said countdown of said first timer interval.

11. The method as recited in claim 9 comprising stopping the countdown of the first time interval and beginning a countdown of a second time interval by a second timer concurrent to activation of said override mechanism.

12. The method as recited in claim 9 comprising successively generating each of a plurality of indicating signals by said transmitter to said first timer upon expiration of corresponding, successive second time intervals and upon successively repeated activation of said override mechanism, and said smoke detector still detecting smoke.

13. A method of automatically shutting off at least one appliance comprising:
   detecting smoke in an area of the at least one appliance,
   generating an indication signal to a first timer upon the detecting of smoke,
   starting a countdown of a first time interval by said first timer,
   decoupling the at least one appliance from an energy source upon the expiration of the first time interval,
   overriding the decoupling of the at least one appliance from the energy source prior to expiration of said first time interval,
   stopping the countdown of the first time interval and beginning a countdown of a second time interval by a second timer concurrent to overriding the decoupling of the at least one appliance from the energy source, and
   beginning a countdown of at least one other first time interval by the first timer upon expiration of said second time interval and smoke still being detected.

14. The method as recited in claim 13 generating a timer signal concurrent to and indicative of said countdown of said first timer interval.

15. The method as recited in claim 13 comprising successively generating each of a plurality of indicating signals to the first timer upon expiration of corresponding, successive second time intervals and upon successively overriding the decoupling of the at least one appliance from the energy source, and still detecting smoke.

* * * * *